No. 885,825. PATENTED APR. 28, 1908.
C. P. ANDERSON.
WEED DESTROYER.
APPLICATION FILED NOV. 1, 1907.

3 SHEETS—SHEET 1.

Witnesses

Charles P. Anderson
Inventor

By
Attorneys

No. 885,825. PATENTED APR. 28, 1908.
C. P. ANDERSON.
WEED DESTROYER.
APPLICATION FILED NOV. 1, 1907.

3 SHEETS—SHEET 2.

Witnesses
H. A. Simadel.
M. A. Schmidt

Inventor
Charles P. Anderson

By Milos R. Stevens &c.

Attorneys,

No. 885,825. PATENTED APR. 28, 1908.
C. P. ANDERSON.
WEED DESTROYER.
APPLICATION FILED NOV. 1, 1907.
3 SHEETS—SHEET 3.
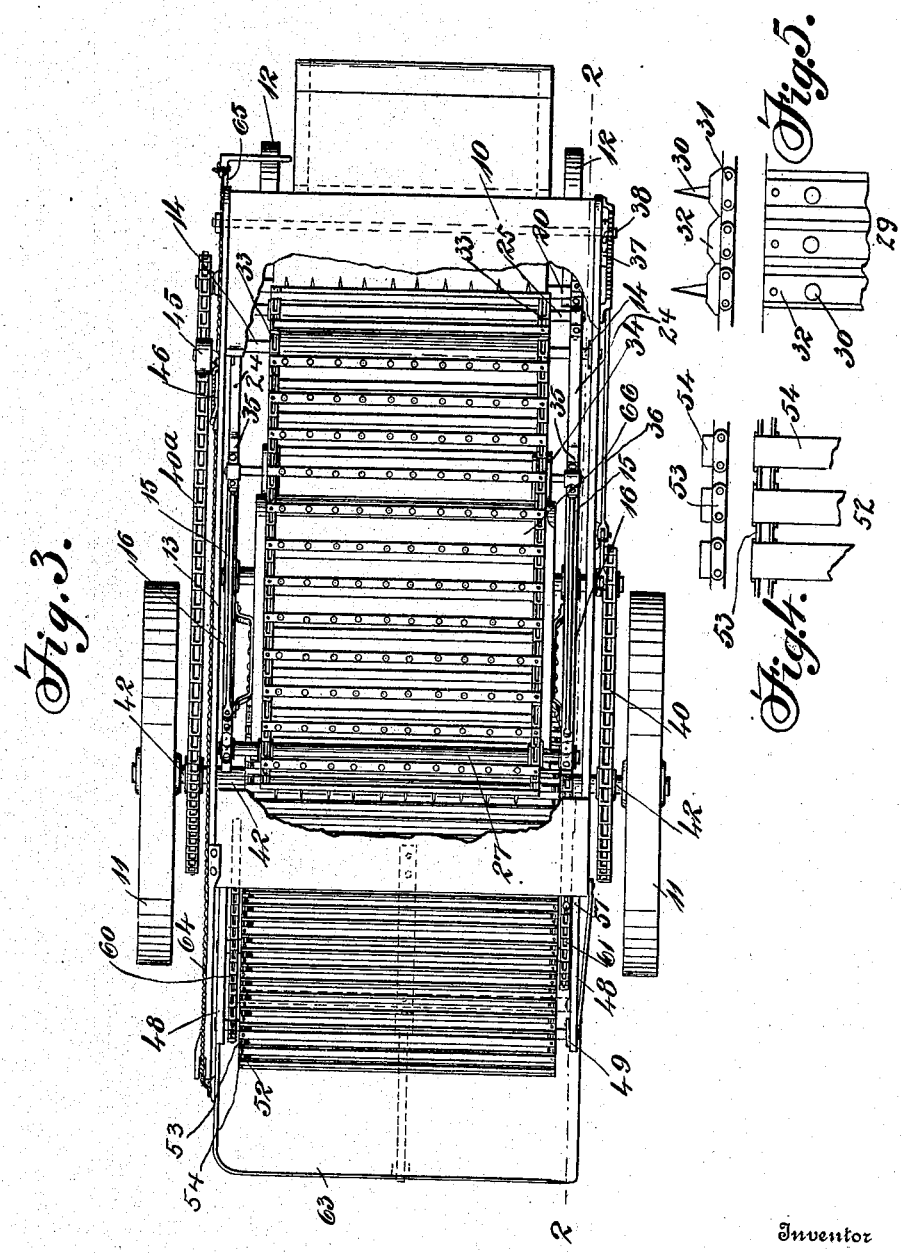

UNITED STATES PATENT OFFICE.

CHARLES P. ANDERSON, OF BROWN VALLEY, MINNESOTA.

WEED-DESTROYER.

No. 885,825.  Specification of Letters Patent.  Patented April 28, 1908.

Application filed November 1, 1907. Serial No. 400,193.

*To all whom it may concern:*

Be it known that I, CHARLES P. ANDERSON, citizen of the United States, residing at Brown Valley, in the county of Traverse and State of Minnesota, have invented certain new and useful Improvements in Weed-Destroyers, of which the following is a specification.

This invention is a machine for destroying weeds and grasses in a field, and has for its object to provide a machine of this kind which is simple in construction, and reliable and efficient in operation.

The invention comprises a wheel-driven cylinder armed with spikes which enter the ground and pull up the weeds and grasses by their roots. Means are also provided for removing the weeds and grasses from the cylinder and delivering the same to a receptacle carried by the machine, which receptacle may be dumped at will by the operator.

Figure 1:
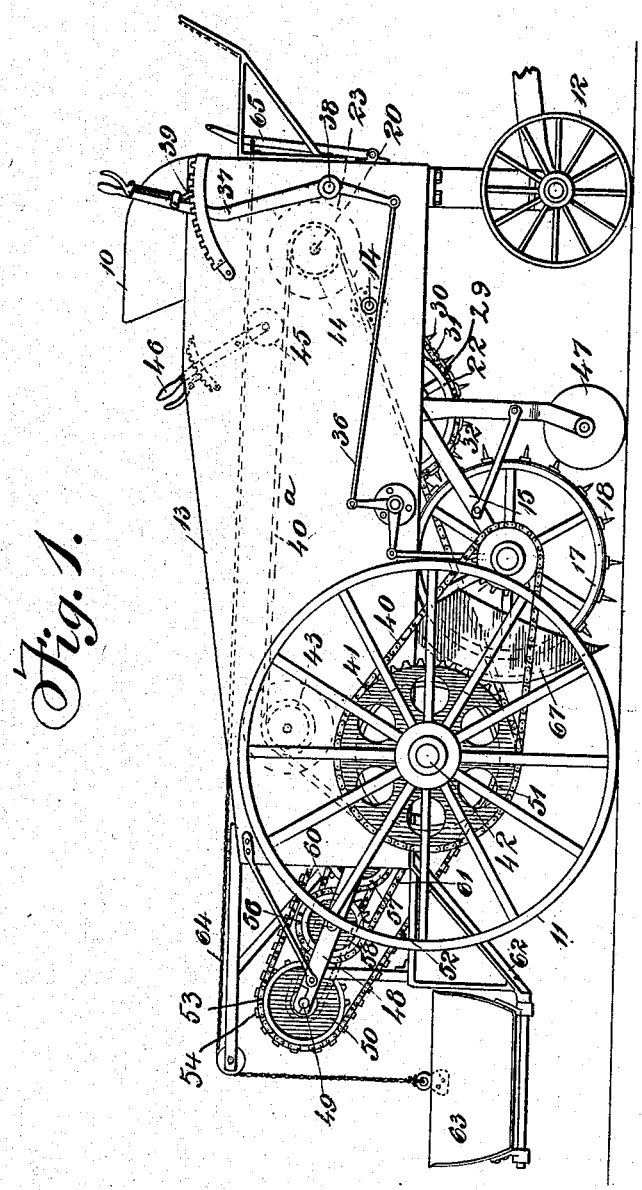
Figure 2:
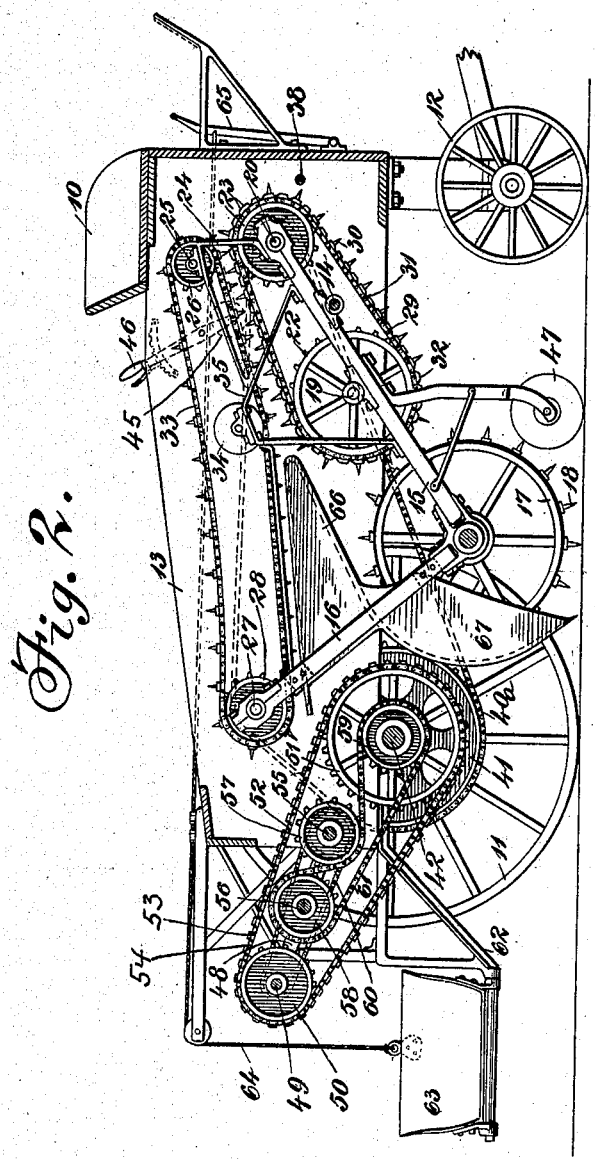

In the accompanying drawings, Figure 1 is an elevation of the invention. Fig. 2 is a longitudinal section on the line 2—2 of Fig. 3. Fig. 3 is a plan view. Figs. 4 and 5 are details showing the construction of the conveyer and clearer-belts hereinafter referred to.

Referring specifically to the drawings, the supporting-frame of the machine is a box-like structure mounted on wheels, and having at its front end a seat 10 for the operator or driver. The rear wheels 11 are the drive-wheels, and the front wheels 12 are for guiding the machine. Suitable means for attachment of the draft-animals are provided.

Extending between the side-walls 13 of the supporting-frame, and mounted therein in any suitable manner, is a transverse shaft 14 on which is mounted to rock thereon, a frame which carries the working parts to be hereinafter described. This frame comprises angularly disposed beams 15 and 16 respectively, the former of which is pivotally mounted on the shaft 14. At the junction of the beams is a bearing in which is revolubly mounted a cylinder 17 armed with spikes 18. The beam 15 has bearings for the shafts 19 and 20 of sprocket-wheels 22 and 23 respectively, and on said beam is also mounted a supporting-bracket 24 for the bearing of the shaft 25 of a sprocket-wheel 26. The beam 16 is provided with a bearing for the shaft 27 of a sprocket-wheel 28. The supporting-frame and associated parts herein described are duplicated on the opposite side of the machine. Over the sprocket-wheels 22 and 23 travels a belt 29 armed with spikes 30. Said belt comprises chains 31 passing over the sprocket-wheels on each side of the machine, and connected by cross-slats 32 to which the spikes 30 are fastened. The slats lie close together so that the weeds, grasses and dirt cannot drop therethrough. This construction is clearly illustrated in Fig. 5 in which an end and plan view of a portion of the belt is shown. A spiked-belt 33 travels over the sprocket-wheels 26 and 28, and said belt is engaged by an idler 34 carried by a bracket 35 mounted on the beam 15. The object of the idler is to guide the belt 33 so that it will travel in close proximity to the belt 30 for a purpose to be hereinafter described.

The supporting-frame of the spiked cylinder and belts is connected by a suitable system of links 36 with a hand-lever 37 in order that the same may be raised or lowered. The hand-lever is pivoted at 38 to the side-wall 13 of the machine-frame near the seat 10 so as to be in easy reach of the driver, and said lever is provided with the usual latch 39 for locking it. The spiked cylinder is thrown into and out of operation by rocking its supporting-frame on the shaft 14 which is done by the hand-lever herein described.

The spiked cylinder 17 is driven by a chain 40 from the rear or drive-axle 42. The belts 29 and 33 are driven by a chain 40ª which passes over a sprocket-wheel 41 on the rear-axle and over a sprocket-wheel 43 on the shaft 27, and a sprocket-wheel 44 on the shaft 20. This chain is provided with a tightener pulley 45 carried by and operated by a hand-lever 46 pivoted to the side-wall 13 of the machine-frame. In front of the spiked cylinder 17 at each end thereof travel rolling colters 47 which are carried by the beam 15.

At the rear end of the machine, at each side thereof, are mounted brackets 48 provided with bearings for the shaft 49 of sprocket-wheels 50. On the rear-axle 42, at each side of the machine, are loosely mounted sprocket-wheels 51. The sprocket-wheels are connected by a conveyer-belt 52 comprising chains 53 which are connected by cross-slats 54 spaced apart sufficiently to permit the dirt to drop back on the field. The details of construction of this belt are shown in Fig. 4 which is an end and a plan view of a portion of the belt. On the bracket 48 are also mounted the shafts 55 and 56 respectively, of sprocket-wheels 57 and 58. On the rear-axle 42 is made fast a sprocket-wheel 59. On the shafts 49 and 55 are sprocket-wheels which are connected by a chain 60. The conveyer-belt 52 is driven from the rear-axle by means of a chain 61 which passes over the sprocket-wheels 59 and 58, and under the sprocket-wheel 57. The motion thus imparted to the shaft 55 is transmitted to the shaft 49 by the sprocket-wheels thereon which are connected by the chain 60. The object of this gearing is to obtain the travel of the conveyer-belt in the required direction which is opposite to that of the travel of the drive-axle or toward the rear end of the machine.

At the rear end of the machine is pivotally mounted on a suitable bracket 62 a receptacle 63 into which the conveyer-belt 52 discharges. To this receptacle is connected a rope 64 which leads to a trip-lever 65 pivoted near the seat 10 so as to be in easy reach of the driver, whereby the receptacle may be tilted to dump the load.

When the spiked cylinder 17 is lowered into operating position, and the machine is driven across the field, the spikes 18 enter the ground and pull up the grass and weeds by their roots. The spikes are cleared of the trash thus pulled up by the spiked belt 29, the sprocket-wheel 22 being so located with respect to the spiked cylinder that the belt will travel sufficiently close thereto for this purpose. The belt and cylinder travel in the same direction. From the belt 29 the roots and weeds are removed by the spiked belt 33. That side of said belt which is next to the belt 29 travels in the opposite direction to the latter or toward the rear end of the machine, and the grass and roots are removed from the belt 29 by a combing action. The belt 33 carries the grass and roots to the conveyer-belt 52, and the latter drops them into the receptacle 63 from which they may be dumped at will by the operator by means of the trip-lever 65 and the rope 64. The arm 16 carries a platform 66 arranged close to the belt 33 and bridging the space between the spiked belt 29 and the conveyer-belt 52. The grass and roots are carried over this platform by the belt 33 and thrown on the conveyer-belt as already described. The arm 16 also carries a shield 67 inclosing the rear end of the spiked-cylinder 17.

I claim,—

1. A weed-destroyer comprising a supporting-frame, a cylinder armed with spikes which dig into the ground, a spiked-belt traveling in close proximity to the spiked cylinder for removing the material therefrom, and means for removing the material from the spiked belt.

2. A weed-destroyer comprising a supporting-frame, a cylinder armed with spikes which dig into the ground, a spiked belt traveling in close proximity to the spiked cylinder for removing the material therefrom, a receptacle, and means for removing the material from the spiked belt to the receptacle.

3. A weed-destroyer comprising a supporting-frame, a cylinder armed with spikes which dig into the ground, a spiked belt traveling in close proximity to the spiked cylinder for removing the material therefrom, a conveyer, and means for removing the material from the spiked belt to the conveyer.

4. A weed-destroyer comprising a supporting-frame, a cylinder armed with spikes which dig into the ground, a spiked-belt traveling in close proximity to the spiked cylinder for removing the material therefrom, and a spiked belt traveling in close proximity to the other belt and in the opposite direction for removing the material therefrom.

5. A weed-destroyer comprising a supporting-frame, a cylinder armed with spikes which dig into the ground, a spiked belt traveling in close proximity to the spiked cylinder for removing the material therefrom, a spiked belt traveling in close proximity to the other belt and in the opposite direction for removing the material therefrom, a receptacle, and means for conveying the material to the receptacle.

6. A weed-destroyer comprising a supporting-frame, a cylinder armed with spikes which dig into the ground, a spiked belt traveling in close proximity to the spiked cylinder for removing the material therefrom, a spiked belt traveling in close proximity to the other belt and in the opposite direction for removing the material therefrom, and a conveyer arranged to receive the material from the second belt.

7. A weed-destroyer comprising a supporting-frame, a vertically swinging frame mounted thereon, a spiked cylinder, and a spiked belt carried by the swinging frame, said belt traveling in close proximity to the cylinder for removing the material therefrom, and means for raising and lowering the swinging frame.

In testimony whereof I affix my signature, in presence of two witnesses.

CHARLES P. ANDERSON.

Witnesses:
EDWARD A. BENSON,
WILLIAM K. PAQUIN.